US012581031B1

(12) United States Patent
Stepura et al.

(10) Patent No.: US 12,581,031 B1
(45) Date of Patent: Mar. 17, 2026

(54) REAL-TIME VIDEO SIGNAL RELAY DEVICE

(71) Applicant: Oleksandr Stepura, Kyivska oblast (UA)

(72) Inventors: Oleksandr Stepura, Kyivska oblast (UA); Volodymyr Stepura, Kyivska oblast (UA)

(73) Assignee: Oleksandr Stepura, Kyivska oblast (UA)

( * ) Notice: Subject to any disclaimer, the term of this patent is extended or adjusted under 35 U.S.C. 154(b) by 0 days.

(21) Appl. No.: 19/341,414

(22) Filed: Sep. 26, 2025

(30) Foreign Application Priority Data

May 12, 2025 (UA) ............................. a 2025 02206

(51) Int. Cl.
H04N 5/44 (2011.01)
H04N 7/01 (2006.01)

(52) U.S. Cl.
CPC ................. H04N 7/01 (2013.01); H04N 5/44 (2013.01)

(58) Field of Classification Search
CPC .................................. H04N 7/01; H04N 5/44
USPC .............................................. 348/441, 725
See application file for complete search history.

(56) References Cited

U.S. PATENT DOCUMENTS

| | | | | |
|---|---|---|---|---|
| 7,053,859 | B2 * | 5/2006 | Jackson | ................... H01Q 3/04 |
| | | | | 343/882 |
| 9,294,177 | B2 * | 3/2016 | Wang | ................... H04B 7/0665 |
| 9,756,305 | B2 * | 9/2017 | Kim | ......................... H04N 5/44 |
| 10,368,028 | B2 * | 7/2019 | Hembert | ................ G09G 5/006 |
| 11,165,521 | B2 * | 11/2021 | Levy | ..................... H04L 5/0023 |
| 2017/0244457 | A1 * | 8/2017 | Tholen | ................. H04B 7/0837 |
| 2019/0222296 | A1 * | 7/2019 | Khandani | .............. H04B 7/086 |

FOREIGN PATENT DOCUMENTS

| | | | |
|---|---|---|---|
| UA | | 49932 U | 5/2010 |

* cited by examiner

*Primary Examiner* — Trang U Tran
(74) *Attorney, Agent, or Firm* — SALIWANCHIK, LLOYD & EISENSCHENK

(57) ABSTRACT

A real-time video signal relay device includes a platform for receiving an analog video signal, a system for controlling the received signal, and a system for converting the received signal into a digital data flow. The system for receiving the analog video signal includes an antenna module and a set of analog video signal receivers, the antenna module includes a set of sectoral antennas arranged circumferentially and oriented so as to overlap adjacent sectors. Each of the analog video signal receivers is connected to two antennas. Each of the analog video signal receivers is configured to determine a power level of the video signal that is transmitted to the sectoral antenna to which the analog video signal receiver is connected. The system for controlling the received signal includes a microcontroller that is connected to each analog video signal receiver and a video switcher that is connected to the microcontroller and to the set of the analog video signal receivers. The microcontroller is configured to select an active sector based on a video signal power level, and the system for converting the received signal into the digital data flow comprises a video encoder and a digital radio signal transceiver device.

5 Claims, 2 Drawing Sheets

REAL-TIME VIDEO SIGNAL RELAY DEVICE

CROSS-REFERENCE TO RELATED APPLICATION

This application claims priority to Ukrainian Application No. a 2025 02206, filed May 12, 2025, which is hereby incorporated by reference in its entirety.

FIELD OF THE INVENTION

The invention relates to the field of radio technology and wireless communication, in particular, to analog video relay and remote-control systems. The invention may be used in FPV systems that imply control of unmanned aerial vehicles (UAVs) based on a first-person view, i.e., an FPV drone, in surveillance systems and other similar devices that utilize real-time video signal transmission.

BACKGROUND

Remote-control systems such as, e.g., FPV systems, imply that an FPV drone comprises a video camera, and a video signal is transmitted therefrom to a ground control station for playback on special video glasses or a pilot monitor. In order to control the FPV drone, the signal with remote-control commands is transmitted from the ground control station to the FPV drone. Current FPV systems are limited in terms of their operating range, since a signal quality depends on a distance to which it is transmitted, as well as on whether there are any interferences at a signal path.

One of ways to eliminate the limitation in terms of the operating range and to reduce influence of the interferences on the signal is real-time relay of the signals. The relay implies reception of the signals by an intermediary device and transmission of the received signals to the ground control station or to the FPV drone depending on a signal type (whether it is a video signal from the FPV drone or the remote-control commands for controlling the FPV drone from the ground control station).

A real-time video signal relay device is known and described in UA 49932 U published on May 11, 2010. The relay device comprises a platform for receiving an analog video signal, a system for controlling the received signal and a system for converting the received signal into a digital data flow. The system for receiving the analog video signal comprises an antenna device and a radio station. The system for controlling the received signal comprises a signal analysis device and a monitoring and control device. The system for converting the received signal into the digital data flow comprises a device for automatic adjustment of a signal power and a radio station. The relay device is arranged on a transport platform which is a UAV. The signal to be relayed is transmitted to the antenna device. Then, the signal from the antenna device is transmitted to the radio station. Then, the signal from an output of the radio station is received by the signal analysis device. The signal analysis device analyzes parameters of the received signal and transmits an analysis result to the monitoring and control device. Depending on presence and quality of the signal to be relayed, the monitoring and control device generates a control signal. The generated signal is received by an input of the device for automatic adjustment of the signal power, and from its output, the signal is transmitted to the radio station in order to increase or reduce the power of the emitted signal to be relayed.

The above-described known real-time video signal relay device allows to increase a transmission range of the signal by increasing the emission power, as well as by changing an altitude of the UAV on which this device is arranged. However, the known device does not solve the problem of a limited communication sector for transmission of the video signal and remote-control commands with 360° circular sector coverage without using several antennas or complex control systems, as well as ensuring stable signal transmission at long distances (5 km and more). Therewith, the increase of the emission power reduces energy efficiency of the UAV on which the relay device is arranged, while the change of the altitude of this UAV is not always possible, e.g., in view of weather conditions, military operations, etc.

SUMMARY OF THE INVENTION

Embodiments of the invention increase quality and reliability of the real-time video signal relay at a long distance.

The subject invention provides a real-time video signal relay device comprising a system for receiving an analog signal, a system for controlling a received signal and a system for converting the received signal into a digital data flow, wherein, according to the invention, the system for receiving the analog video signal comprises an antenna module and a set of analog video signal receivers; the antenna module comprises a set of sectoral antennas that are arranged circumferentially and oriented so as to overlap adjacent sectors, each of the analog video signal receivers is connected to two antennas, and each of the analog video signal receivers is configured to determine a power level of the video signal arriving at the antenna to which the analog video signal receiver is connected; the system for controlling the received signal comprises a microcontroller that is connected to each of the analog video signal receivers, and a video switcher that is connected to the microcontroller and to the set of the analog video signal receivers, where the microcontroller is configured to select an active sector based on a power level of the video signal, and the system for converting the signal into the digital data flow comprises a video encoder and a digital radio signal transceiver device.

A technical effect of the invention is minimizing noises and losses during real-time relay of the video signal due to use of the sectoral (directional) antennas that cover the 3600 ircular sector and a video signal selection algorithm based on the power level that is executed by means of the microcontroller connected to the set of the analog video signal receivers and to the video switcher.

According to one of embodiments of the invention, the antenna module comprises an omnidirectional short-range antenna that is connected to one of the analog video signal receivers in order to achieve a maximum coverage for reception of the video signal, since the set of the sectoral antennas provides a blind zone that is covered by the omnidirectional antenna.

According to another embodiment of the invention, the set of the sectoral antennas and the omnidirectional short-range antenna is oriented so as to cover the circular sector being 360°, thereby allowing to achieve a maximum coverage for the video signal reception.

According to a further embodiment of the invention, each of the sectoral antennas is directed downwards to the ground at an angle between 50° and 70° with respect to the horizontal, thereby achieving a seamless real-time video signal relay at a distance of up to 8-10 km from a video signal source within the circular sector of 360°.

According to a further embodiment of the invention, each of the analog video signal receivers is configured to support at least two antennas comprised in the antenna module, thereby allowing to optimize the hardware structure of the system for receiving the analog video signal in order to ensure 360° coverage of a video signal receiving area.

According to a further embodiment of the invention, a number of the antennas within the antenna module is a multiple of a number of the analog video signal receivers. This further optimizes the hardware structure of the system for receiving the analog video signal.

The digital radio signal transceiver device is configured to transmit the video signal to a remote computer device of a ground control station. To this end, the remote computer device of the ground control station is connected to a video signal playback tool and configured to visually display a sectoral diagram of power levels of the signal received by the microcontroller from the analog video signal receivers on the video signal playback tool. The remote computer device of the ground control station is further configured to transmit remote-control commands to the microcontroller by means of the digital radio signal transceiver device via a dedicated communication channel that is synchronized with the video signal. This increases control reliability of the relay device, in particular, change of a frequency of receiving the signal, selecting the sector with the best level of the radio signal or starting an autonomous search for the sector with the best level of the radio signal. In particular, when the real-time video signal relay device is used for an FPV system that will be described hereinafter, this increases mission accomplishment efficiency, since it allows an operator to understand in which sector the FPV drone is located relative to the carrier.

BRIEF DESCRIPTION OF THE DRAWINGS

An exemplary embodiment of the real-time video signal relay device according to the invention and use thereof within the UAV is provided hereinafter. The provided example is illustrated in the Figures, where:

The relay device illustrated in FIG. 2 and FIG. 3 is intended to be used in an aerial vehicle, e.g., a UAV This UAV may act as a carrier for another UAV, preferably, an FPV drone. For this reason, the carrier UAV comprises the inventive relay device for real-time transmission of the video signal from the FPV drone to the ground control station and remote-control commands from the ground control station to the FPV drone. However, the inventive relay device may be used in other systems that require real-time transmission of the video signal.

FIGS. 1-3 use the following designations:

1—the antenna module
2—the analog video signal receiver
3—the sectoral antenna
4—the omnidirectional short-range antenna
5—the microcontroller
6—the video switcher
7—the video encoder
8—the digital radio signal transceiver device

9—the remote computer device of the ground control station
10—the video signal playback tool.

Figures that illustrate the claimed invention and the disclosed specific exemplary embodiments do not limit the scope of claims in any way, rather, they only explain the essence of the invention.

DETAILED DESCRIPTION

Figure 1:
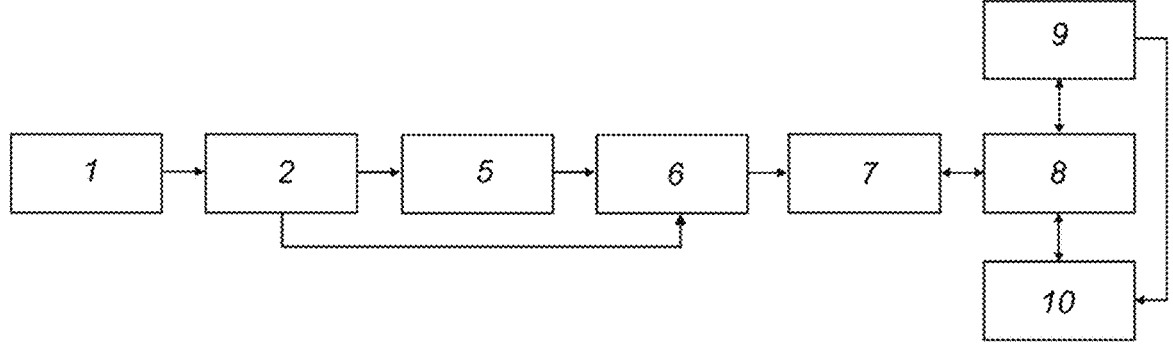
FIG. 1 illustrates a schematic diagram of the real-time video signal relay device.

FIG. 1 illustrates a schematic diagram of a real-time video signal relay device that comprises a system for receiving an analog video signal, a system for controlling a received signal and a system for converting the received signal into a digital data flow.

Figure 2:
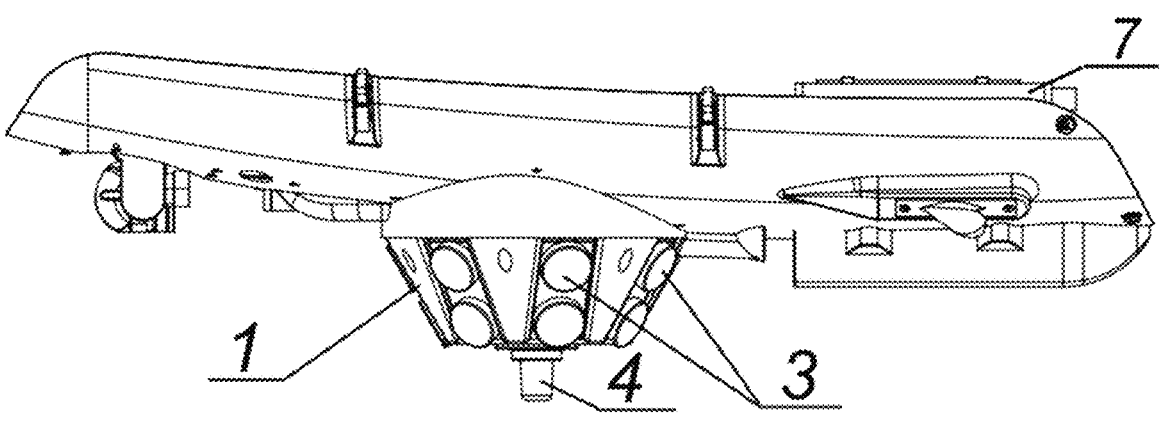
FIG. 2 illustrates a side view of the real-time video signal relay device.
Figure 3:
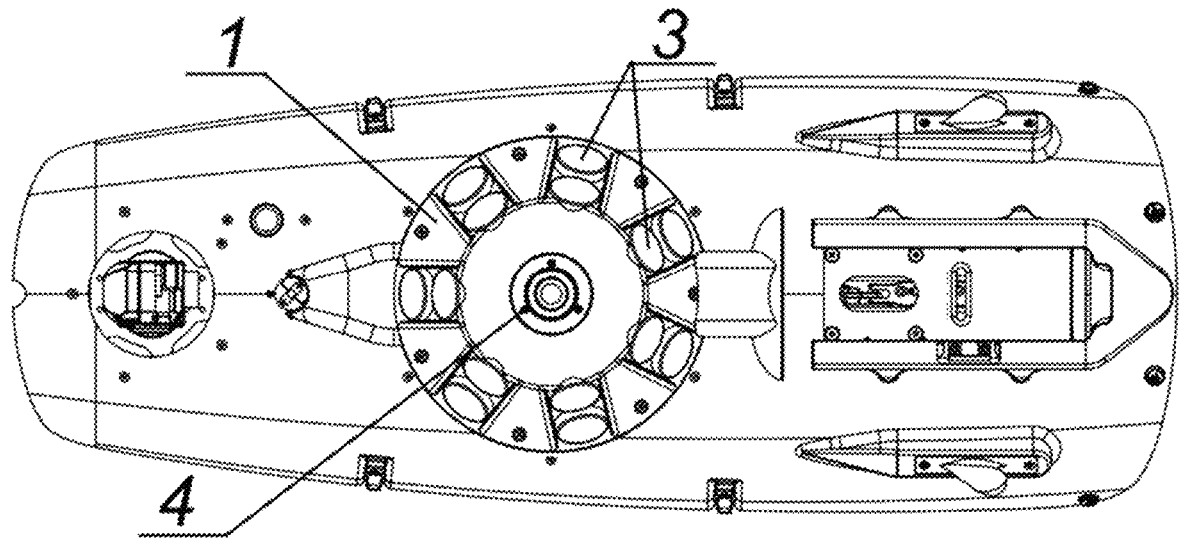
FIG. 3 illustrates a bottom view of the real-time video signal relay device.

The system for receiving the analog video signal comprises an antenna module (1) and a set of analog video signal receivers (2). FIGS. 2 and 3 illustrate an exemplary embodiment of the real-time video signal relay device, where its antenna module (1) comprises a set of seven sectoral antennas (3) and an omnidirectional short-range antenna (4). As illustrated in FIG. 3, the sectoral antennas (3) are arranged circumferentially and, together with the omnidirectional short-range antenna (4), cover a circular sector of 360°. Therewith, the sectoral antennas (3) are oriented so as to overlap adjacent circular sectors. According to the example, the antenna module (1) has a shape of truncated inverted cone having a side surface with the sectoral antennas (3) arranged thereon, the sectoral antennas are directed downwards towards the ground at an angle between 50° and 70° with respect to the horizontal, and an optimal angle is 60°. The omnidirectional short-range antenna (4) is arranged in a central part of the antenna module (1) at the truncation of the inverted cone. Each of the analog video signal receivers (2) is connected to two antennas. According to the exemplary embodiment illustrated in FIGS. 2 and 3, the system for receiving the analog video signal comprises four analog video signal receivers (2), and two antennas are connected to each of them: seven sectoral antennas (3) and the omnidirectional short-range antenna (4). The sectoral antennas (3) are connected as follows: two adjacent (first and second) sectoral antennas (3) are connected to the first analog video signal receiver (2); the third and fourth sectoral antennas (3), which are circumferentially arranged after them, are connected to the second analog video signal receiver (2); the fifth and sixth sectoral antennas (3), which are circumferentially arranged after them, are connected to the third analog video signal receiver (2); the seventh sectoral antenna (3) and the omnidirectional short-range antenna (4) are connected to the fourth analog video signal receiver (2). Therefore, the first and second sectoral antennas (3) form a single circumferential sector, the third and fourth sectoral antennas (3) form a second circumferential sector adjacent thereto, the fifth and sixth sectoral antennas (3) form a third circumferential sector adjacent thereto, and the seventh sectoral antenna (3) together with the omnidirectional short-range antenna (4) form a fourth circumferential sector. Said circumferential sectors together form a circumferential sector of 360°. The sectoral antennas (3) are directional (directed) antennas that are oriented in a certain direction for emitting or receiving a major part of the power, thereby allowing to increase efficiency and to reduce an influence of interferences. The omnidirectional short-range antenna (4) covers a blind zone provided by the set of the sectoral antennas (3). Each of the analog video signal receivers (2) is configured to determine a power level of the signal that is transmitted to the sectoral antenna (3) to which the analog video signal receiver (2) is connected. The analog video signal receiver (2) may be a VRX video receiver that meets the above-mentioned requirements.

According to FIG. 1, the system for controlling the receiving signal comprises a microcontroller (5) and a video switcher (6). The microcontroller (5) is connected to each of the analog video signal receivers (2). The microcontroller (5) is configured to process a reading of the power level of the signal received from the analog video signal receivers (2) and to select an active sector based on the signal power level. To this end, the microcontroller (5) is programmed to select the active sector based on the signal power level. Also, the microcontroller (5) is programmed to store IDs of each of the analog video signal receivers (2). For example, it may be a number of the analog video signal receiver (2) or another similar ID. The microcontroller (5) is connected to the video switcher (6) in order to control it. The video switcher (6) is connected to the set of the analog video signal receivers (2) and intended to switch the video signal received therefrom.

According to FIG. 1, the system for converting the received signal into the digital data flow comprises a video encoder (7) and a digital radio signal transceiver device (8). The video encoder (7) is intended to convert the analog video signal into the digital data flow. The digital radio signal transceiver device (8) is connected to the video encoder (7) and intended to transmit the digital radio signal to a distance of up to 150 km.

An exemplary use of the above-described real-time video signal relay device for an FPV system is provided hereinafter. The FPV system comprises a self-powered carrier UAV and an FPV drone arranged on a payload platform of the carrier UAV. According to the example, the real-time video signal relay device is arranged on the payload platform of the carrier UAV. The carrier UAV or the FPV drone is not the subject matter of the present invention.

Remote control of the FPV drone is performed from a remote computer device (9) of a ground control station. The remote computer device (9) of the ground control station is equipped with a desktop application intended to control the video signal relay in real time via a configuration and monitoring interface. The digital radio signal transceiver device (8) transmits the video signal to the remote computer device (9) of the ground control station. The remote computer device (9) of the ground control station also transmits remote-control commands to the microcontroller (5) by means of the digital radio signal transceiver device (8) via a dedicated communication channel that is synchronized with the video signal. The digital radio signal transceiver device (8) also transmits the video signal to a video signal playback tool (10) simultaneously with the transmission of the video signal to the remote computer device (9) of the ground control station. The remote computer device (9) of the ground control station, by means of the desktop application, displays a sectoral diagram of the power levels of the signal from the analog video signal receivers (2) at the video signal playback tool (10).

The above-described real-time video signal relay device comprised in the FPV system is used in the following way. The carrier UAV delivers the FPV drone to a mission accomplishment area. After disconnection from the carrier UAV, the FPV drone flies autonomously to a mission accomplishment site that may be located at a distance of up to 150 km from the ground control station. Therewith, data exchange between the FPV drone and the ground control station is performed via the real-time video signal relay device. To this end, each analog video signal receiver (2)

receives the signal from two antennas to which it is connected and determines the best power level of the video signal. All the analog video signal receivers (2) transmit data about the power level of the video signal to the microcontroller (5). The microcontroller (5) analyzes the received data and selects the video signal having the best power level. The selected video signal is transmitted to the video encoder (7) via the video switcher (6). The video encoder (7) converts the analog signal into the digital data flow (being a network flow). The digital data flow with the video signal is received by the digital radio signal transceiver device (8) that, in turn, transmits the signal to the remote computer device (9) of the ground control station.

The operator controls the real-time video signal relay device via the remote computer device (9) of the ground control station by means of the desktop application. In particular, the interface of the desktop application allows to perform the following operations: selection of a frequency for receiving the video signal, monitoring the power level of the video signal in real time for each analog video signal receiver (2), display of the sectoral diagram of the signal levels, automatic or manual switch of the active sectoral antenna (3), automatic selection of the active sector having the highest power level of the video signal.

The microcontroller (5) plays a main role in collecting and processing the data from the analog video signal receivers (2). The desktop application of the remote computer device (9) of the ground control station and the microcontroller (5) interact by means of the digital radio signal transceiver device (8) via the dedicated communication channel that is synchronized with the video signal. To this end, the microcontroller (5) receives values of the power level of the video signal from the analog video signal receivers (2) and processes them. The desktop application sends a request for the video signal power level values via the command 'GET_RSSI'. The operator can manually change the frequency of receiving the video signal by sending the command 'SET_FREQ'. Based on the received data about the video signal power level, the microcontroller (5) automatically controls the video switcher (6) to select the video signal having the highest power level for its subsequent relay to the video signal playback tool (10). The video signal is displayed by means of the video signal playback tool (10), in particular, the desktop application of the remote computer device (9) of the ground control station forms a sectoral diagram for displaying a direction of receiving the video signal having the highest power level. This allows to determine a source of the video signal of the highest quality and to perform correction of the settings of the real-time video signal relay.

Integration of the microcontroller (5), the sets of the analog video signal receivers (2) and the desktop application on the remote computer device (9) increases the reliability of controlling the reception of the high-quality video signal from the FPV drone. Owing to the real-time monitoring of the power level of the video signal and to the automatic selection of the active sector based on the power level for the video signal relay to the ground station, the inventive relay device allows to avoid noises and to enhance the data exchange between the FPV drone and the ground control station at the high distance between them.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention claimed is:

1. A real-time video signal relay device comprising a system for receiving an analog video signal, a system for controlling a received signal, and a system for converting the received signal into a digital data flow, wherein the system for receiving the analog video signal comprises an antenna module and a set of analog video signal receivers, the antenna module comprises a set of sectoral antennas that are arranged circumferentially and oriented so as to overlap adjacent sectors, each of the analog video signal receivers is connected to at least two sectoral antennas of the set of sectoral antennas, and each of the analog video signal receivers is configured to determine a power level of the analog video signal that is transmitted by said at least two sectoral antennas to which the analog video signal receiver is connected, the system for controlling the received signal comprises a microcontroller that is connected to each of the analog video signal receivers, and a video switcher that is connected to the microcontroller and to the set of the analog video signal receivers, where the microcontroller is configured to select an active sector based on a power level of the analog video signal, and the system for converting the received signal into the digital data flow comprises a video encoder and a digital radio signal transceiver device, wherein the set of the sectoral antennas together with an omnidirectional short-range antenna are oriented so as to cover a circumferential sector of 360°.

2. The device according to claim 1, wherein the antenna module comprises the omnidirectional short-range antenna that is connected to one of the analog video signal receivers.

3. The device according to claim 1, wherein each sectoral antenna is directed downwards towards the ground at an angle between 50° and 70° with respect to the horizontal.

4. The device according to claim 1, wherein each of the analog video signal receivers is configured to support said at least two sectoral antennas to which the analog video signal receiver is connected.

5. The device according to claim 1, wherein a number of the antennas within the antenna module is a multiple of a number of the analog video signal receivers.

* * * * *